US012798790B2

(12) United States Patent
Yavin et al.

(10) Patent No.: US 12,798,790 B2

(45) Date of Patent: Nov. 17, 2026

(54) LONG RANGE RECONNAISSANCE POD

(71) Applicant: RAFAEL ADVANCED DEFENSE SYSTEMS LTD., Haifa (IL)

(72) Inventors: Zvi Yavin, Gilon (IL); Eran Arad, Haifa (IL); Michael Weidenfeld, Haifa (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 0 days.

(21) Appl. No.: 19/125,340

(22) PCT Filed: Nov. 9, 2023

(86) PCT No.: PCT/IL2023/051154

§ 371 (c)(1),
(2) Date: Apr. 29, 2025

(87) PCT Pub. No.: WO2024/134641

PCT Pub. Date: Jun. 27, 2024

(65) Prior Publication Data

US 2026/0159250 A1 Jun. 11, 2026

(30) Foreign Application Priority Data

Dec. 20, 2022 (IL) .......................................... 299298

(51) Int. Cl.
*B64D 47/08* (2006.01)

(52) U.S. Cl.
CPC .................................... *B64D 47/08* (2013.01)

(58) Field of Classification Search
CPC ...................................................... B64D 47/08
See application file for complete search history.

(56) References Cited

U.S. PATENT DOCUMENTS 2,906,181 A * 9/1959 Hofstra .................. G03B 15/00 396/10

3,721,410 A * 3/1973 Anspacher .............. F42B 15/08 178/76

(Continued)

FOREIGN PATENT DOCUMENTS

WO 20220012824 A1 1/2022

WO WO-2022012824 A1 * 1/2022 ........... G01S 7/4813

OTHER PUBLICATIONS

PCT International Search Report, PCT Application No. PCT/IL2023/051154, Jan. 22, 2024,8 pages.

*Primary Examiner* — Joshua J Michener
*Assistant Examiner* — Michael B. Kreiner
(74) *Attorney, Agent, or Firm* — The Roy Gross Law Firm, LLC; Roy D. Gross

(57) ABSTRACT

A long-range reconnaissance pod comprises a cylindrical body and a hollow enclosure forward to said body within which an optical sensor configured to image areas of interest during a long-range reconnaissance mission is housed, wherein a casing of said forward hollow enclosure comprises a target-facing section and a target-opposing section that both extend to a leading edge of said pod, and wherein an optical window adapted to protect said optical sensor from external flow is secured to said target-facing section, and both sections are configured with an external aerodynamic design that renders the optical window substantially optically distortion-free.

4 Claims, 4 Drawing Sheets

(56) References Cited

U.S. PATENT DOCUMENTS

| | | | | | |
|---|---|---|---|---|---|
| 4,717,822 | A * | 1/1988 | Byren | F41G 7/2253 | 250/203.1 |
| 5,368,254 | A * | 11/1994 | Wickholm | F41G 7/2253 | 244/3.16 |
| 6,533,218 | B1 * | 3/2003 | Jahn | B64D 47/08 | 348/113 |
| 6,658,207 | B1 * | 12/2003 | Partynski | G01C 11/025 | 348/145 |
| 7,494,089 | B2 * | 2/2009 | Williams | F41G 7/308 | 244/3.17 |
| 7,679,037 | B2 * | 3/2010 | Eden | F42B 12/365 | 348/148 |
| 8,575,527 | B2 * | 11/2013 | Fry | F41G 7/2293 | 342/52 |
| 9,357,111 | B2 * | 5/2016 | White | G03B 17/02 | |
| 2008/0211912 | A1 | 9/2008 | Greenfeld et al. | | |
| 2014/0139730 | A1 | 5/2014 | White et al. | | |
| 2016/0224842 | A1 | 8/2016 | Greenfeld et al. | | |
| 2026/0022924 | A1 * | 1/2026 | Gauckler | F42B 15/01 | |

* cited by examiner

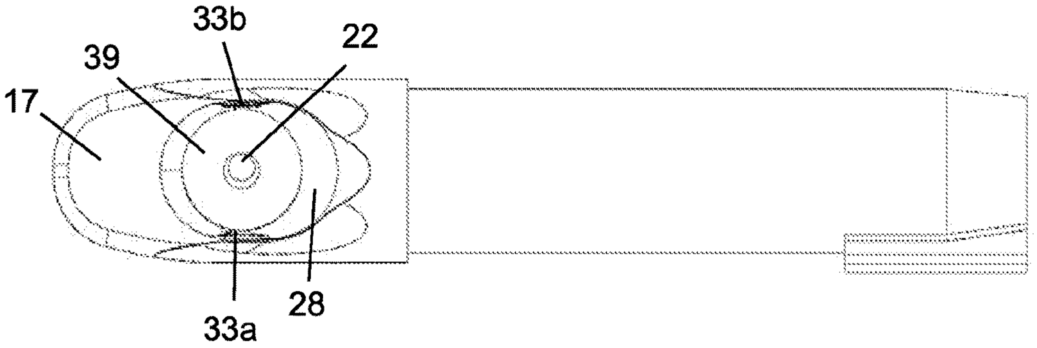
Fig. 6
Fig. 7A
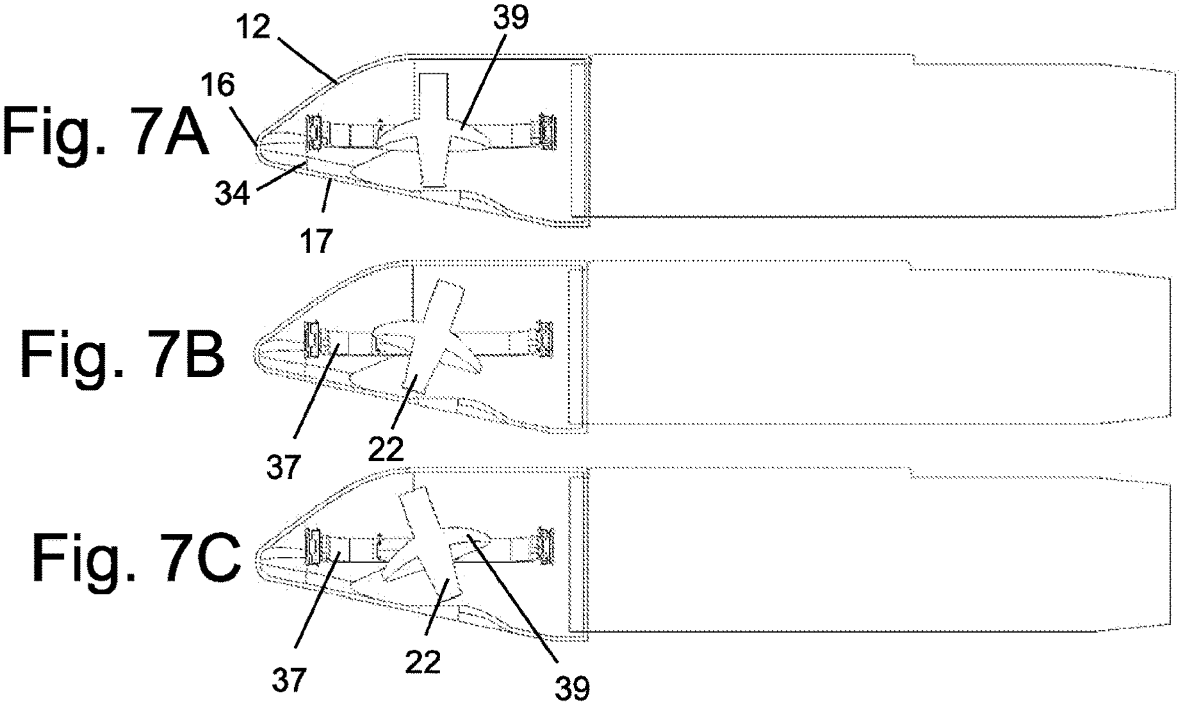
Fig. 7B
Fig. 7C

LONG RANGE RECONNAISSANCE POD

FIELD OF THE INVENTION

The present invention relates to the field of aerial reconnaissance systems. More particularly, the invention relates to a long-range reconnaissance pod.

BACKGROUND OF THE INVENTION

Reconnaissance missions carried out by aircraft for short-term intelligence gathering, such as the observation of specific structures and areas and the movement of enemy forces, are of significant military importance, helping army forces to avoid being surprised by unsuitable terrain conditions or by unexpected enemy forces.

To reduce risk to the aircraft supporting an optical element of a reconnaissance system for acquiring images of a desired area of interest, the aircraft should preferably be located at an altitude of at least 15 km and at a distance of at least 300 km from the target and fly at speeds of up to Mach 1.4. For such long-range photography, the optical element has to be of sufficiently high resolution, for example of one second of arc, in order to accurately discern the target relative to its surroundings.

Many reconnaissance systems are housed in a pod attached to the underside of the aircraft's wings. These pods have one or more optical windows through which the optical element is able to acquire images of the target. However at transonic speeds that are typical of reconnaissance aircraft, shock waves, detached turbulent shear layers or thick turbulent boundary layers develop. These flow structures impede the passage of the light radiation required by the optical element, thereby significantly reducing the resolution of an acquired image.

It is an object of the present invention to ensure the high resolution of images acquired by a long-range reconnaissance pod by reducing losses induced by turbulence and shock wave-related phenomena when the associated aircraft is flying at transonic or supersonic speeds.

Other objects and advantages of the invention will become apparent as the description proceeds.

SUMMARY OF THE INVENTION

A long-range reconnaissance pod comprises a cylindrical body and a hollow enclosure forward to said body within which an optical sensor configured to image areas of interest during a long-range reconnaissance mission is housed, wherein a casing of said forward hollow enclosure comprises two sides, the first side being a target-facing section and a second side being a target-opposing section, both extending to a leading edge of said pod. The terms target-facing and target-opposing as used herein, refer to sections that can be directed toward a target and having sides facing the target and facing away from the target, i.e., being target-facing and target-opposing.

The hollow enclosure further comprises an optical window adapted to protect said optical sensor from external flow fitted in said target-facing section. Both sections are designed and configured with an external aerodynamic design that renders the optical window substantially optically distortion-free. The aerodynamic design of the pod, especially at its leading edge, either prevents the appearance of flow structures that create optical distortions, such as shock waves, separated shear layers, and thick turbulent boundary layers, or confines them to regions at a distance from the line-of-sight at the operation envelope. Flow-induced optical distortions are accordingly avoided or at least minimized to an acceptable level.

The external aerodynamic design with which the target-opposing section is configured ensures that flow separation is avoided, and also ensures smooth flight characteristics of the pod in the presence of shock waves and compressible effects. Smooth flight characteristics are desired during reconnaissance operations to enable the optical sensor contained within the hollow enclosure of the pod to take high quality pictures.

In one aspect, the target-facing section and the target-opposing section are integrally formed together in a non-cylindrical casing portion. Such integrated casing can be manufactured by methods known in the art, such as and not limited to, injecting, pressing, 3D printing, molding, and the like.

In one aspect, the optical window is planar and the target-facing section comprises a window-surrounding plate which supports and is coplanar with the optical window. The target-opposing section comprises a surface that is inclined with respect to the window-surrounding plate by a sufficiently small angle that prevents development of flow separation or ensures that a shock wave will not be localized at the optical window.

The optical window is located far enough from the leading edge of the turret so that shock waves that may develop will occur in front of the optical window (and not over the window). The optical window upstream front should be at least 0.6 D beyond the pod leading edge, where D is the pod diameter.

In one aspect, the hollow enclosure is a hollow turret that is rotatable about the cylindrical body.

In one aspect, a radius of curvature of the leading edge is less than or equal to a product of a diameter of the cylindrical body and a factor of 0.09.

BRIEF DESCRIPTION OF THE DRAWINGS

In the drawings:

FIG. 6 is a bottom view of the pod of FIG. 1; and

FIGS. 7A-C show a side view of the pod of FIG. 1 with the turret shown in cutaway views, showing the optical sensor set to three different angular positions, respectively.

DETAILED DESCRIPTION OF THE INVENTION

As target imaging carried out with airborne reconnaissance pods involves long-range photography to minimize risk to the aircraft on which a pod is mounted, accurate viewing of the target is contingent upon high-resolution imaging. As referred to herein, the term "target" is interchangeable with "area of interest".

The invention is intended for reconnaissance missions using a Long Range Oblique Photography (LOROP) camera that takes oblique high-resolution images of distant objects with a long focal length optical system and through atmospheric attenuation. The target to be imaged is located to the side of the aircraft at a large angle, thus ensuring secured standoff flights. LOROP cameras are configured for mounting within a pod, and the optical window protecting the camera from flow interactions is generally planar and fitted to the side of the pod. As referred to herein, “long range” means a distance of more than 50 KM from the area of interest, requiring a camera having high resolution requirements. A LOROP reconnaissance mission differs from a penetrating-type mission during which the aircraft carrying the camera is flown at a relatively low altitude and is consequently under risk of being attacked. Due to the relatively low altitude of a penetrating-type mission, the camera often takes relatively low-resolution images and the optical window of the pod in which the camera for use in a penetrating-type mission is mounted is often elongated and large-sized.

The Applicant is desirous of providing an optical window at the front end of a LOROP camera mounted pod in order to minimize flow-induced aberrations as much as possible and to thereby avoid the development of a thick turbulent boundary layer on the window. For forward looking observation the shock-wave induced aberrations would be negligible, but this practice is not suitable for LOROP advices, where the observation is performed sideways to the flight direction. In the forward-facing window, due to the stagnation region, there is no boundary-layer-related aberration effect. On the other hand, on a side window, a turbulent Boundary layer develops, creating optical aberrations, unless it is properly treated.

Despite the potential benefits of a front optical window, such an optical window would be subject to aero-optical aberrations due to the proximity of the air flow flowing over the pod. One cause of the optical aberrations is turbulence in the boundary and shear layers of the air flow which flow over the optical window. The light beam which is captured by the camera passes through the turbulent flow is diffused, resulting in image blurring. Flow separation that occurs in front of or over the optical window introduces a highly turbulent shear layer which increases the blur effect of the optical aberrations. Occurrence of shockwaves and supersonic flow pockets over the optical window induce beam deflection, often known as bore-sight error.

Figure 1:
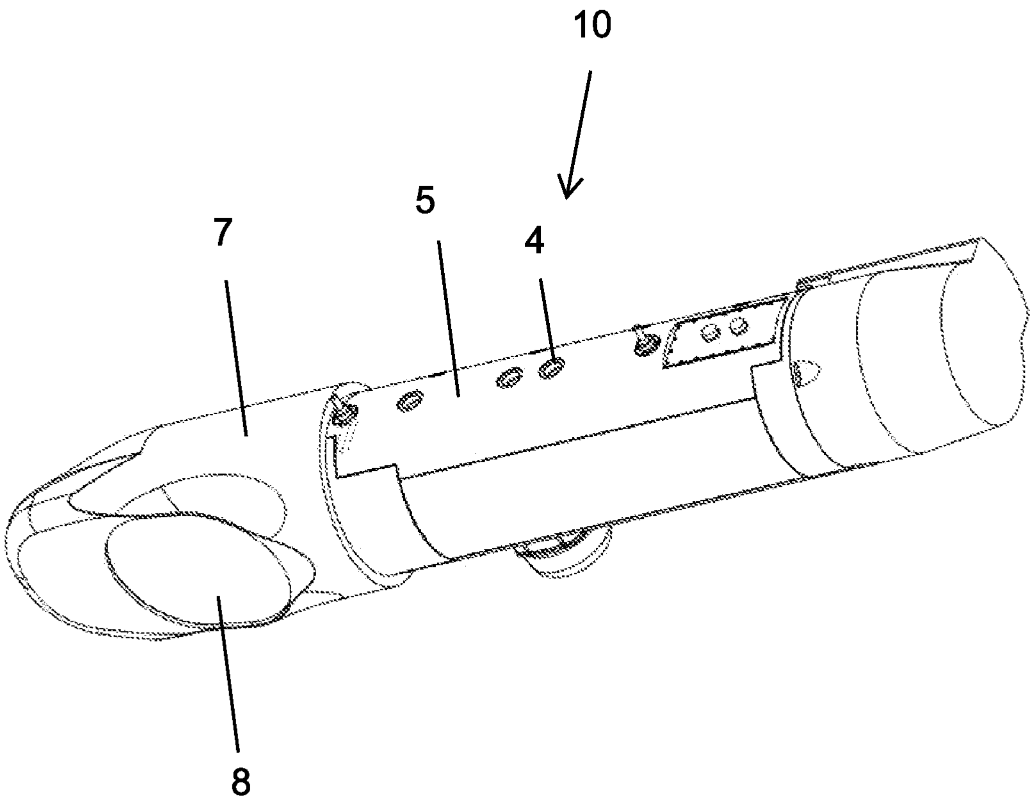
FIG. 1 is a perspective view of a long-range reconnaissance pod according to one embodiment, shown in an imaging-worthy position.

It has now been found that these optical aberrations can be mitigated, or altogether eliminated, by suitably configuring the pod such that the optical window is rendered distortion-free or nearly distortion-free optically by minimizing the destructive effects of the flow over the window. FIG. 1 illustrates long-range reconnaissance pod 10, according to one embodiment. Pod 10 has a stationary cylindrical body 5 configured with a plurality of mounting elements 4 used to mount body 5 onto the fuselage or the wing of an aircraft, so that the longitudinal pod axis is parallel to the aircraft axis. A turret 7 provided with a hollow interior, within which an optical sensor such as a LOROP camera for use in a long-range reconnaissance mission is housed together with the electronic and electromechanical components needed for its proper operation, is rotatably mounted to the forward end of cylindrical body 5. The hollow interior is covered with an optical window 8 made of a material such as zinc sulfide, zinc selenide, sapphire, and spinel that is optically transmissive to the wavelength of radiation to be detected by the optical sensor. Turret 7 is rotatably driven about the pod axis by a rotational drive assembly (not shown) mounted within body 5 that allows angular displacement of up to 360 degrees in either rotational direction, so that optical window 8 will be set to one of the two possible target-facing positions as illustrated that allows a target located at one of the transversal sides of the aircraft to be imaged by the sideways target-facing optical sensor, thereby facilitating use of a LOROP camera. Mounting elements 4 are attached to suitable aircraft regions that ensure that turret 7 will forwardly protrude therefrom and will be able to rotate without interference.

Other views of pod 10 are illustrated in FIGS. 2-7.

Figure 2:
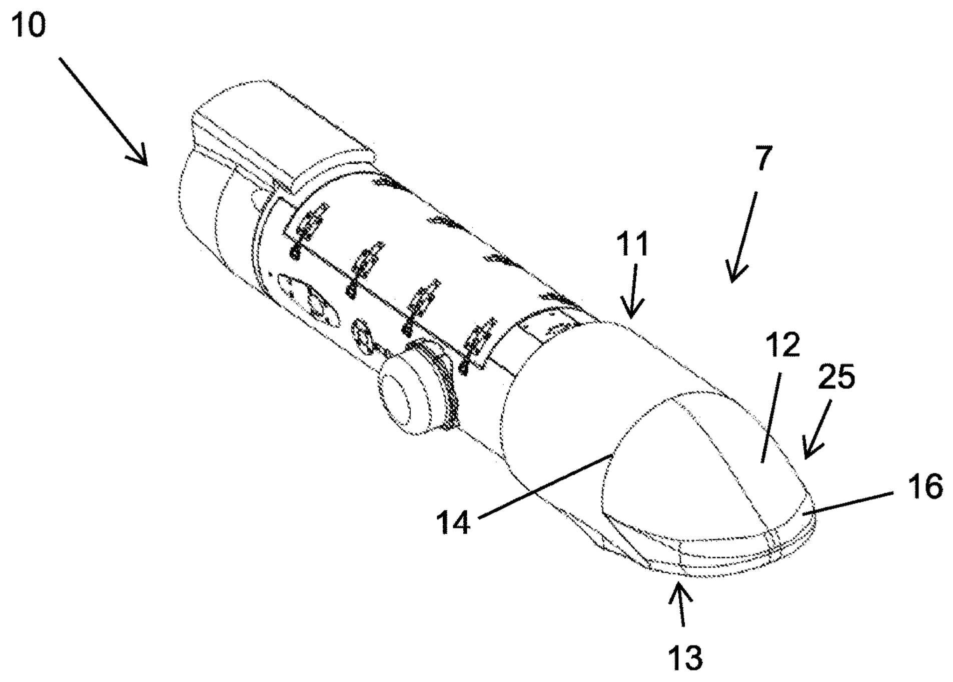
FIG. 2 is another perspective view of the pod of FIG. 1, showing a target-opposing section.
Figure 5:
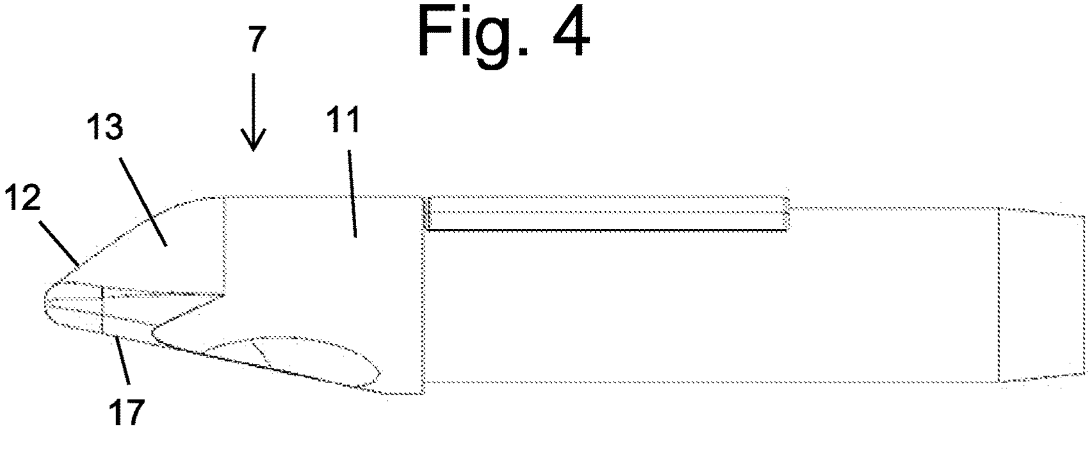
FIG. 5 is a side view of the pod of FIG. 1.

As shown in FIGS. 2 and 5, turret 7 is configured with a rear cylindrical casing portion 11 and with a forward non-cylindrical casing portion 13. Rear cylindrical casing portion 11 has an outer diameter slightly greater than that of cylindrical body 5, allowing turret 7 to rotate about body 5. Forward casing component 13 is designed so that the aerodynamic disturbances are minimized, while maintaining a sufficiently large interior volume to house the required optical devices, image capturing apparatus and supporting mechanical devices. As will be described, non-cylindrical casing portion 13 is configured with two different sections, the first being a “target-facing section” encompassing the optical window that is generally set at a position suitable for acquiring images of a selected target, and the second being a “target-opposing section”, i.e. facing way from the target. Although these two sections are part of the rotatable turret 7 and their relative position is anticipated to constantly change, the target-facing section and the target-opposing section denote the relative position that the corresponding section is intended to occupy when a selected target is imaged.

Figure 3:
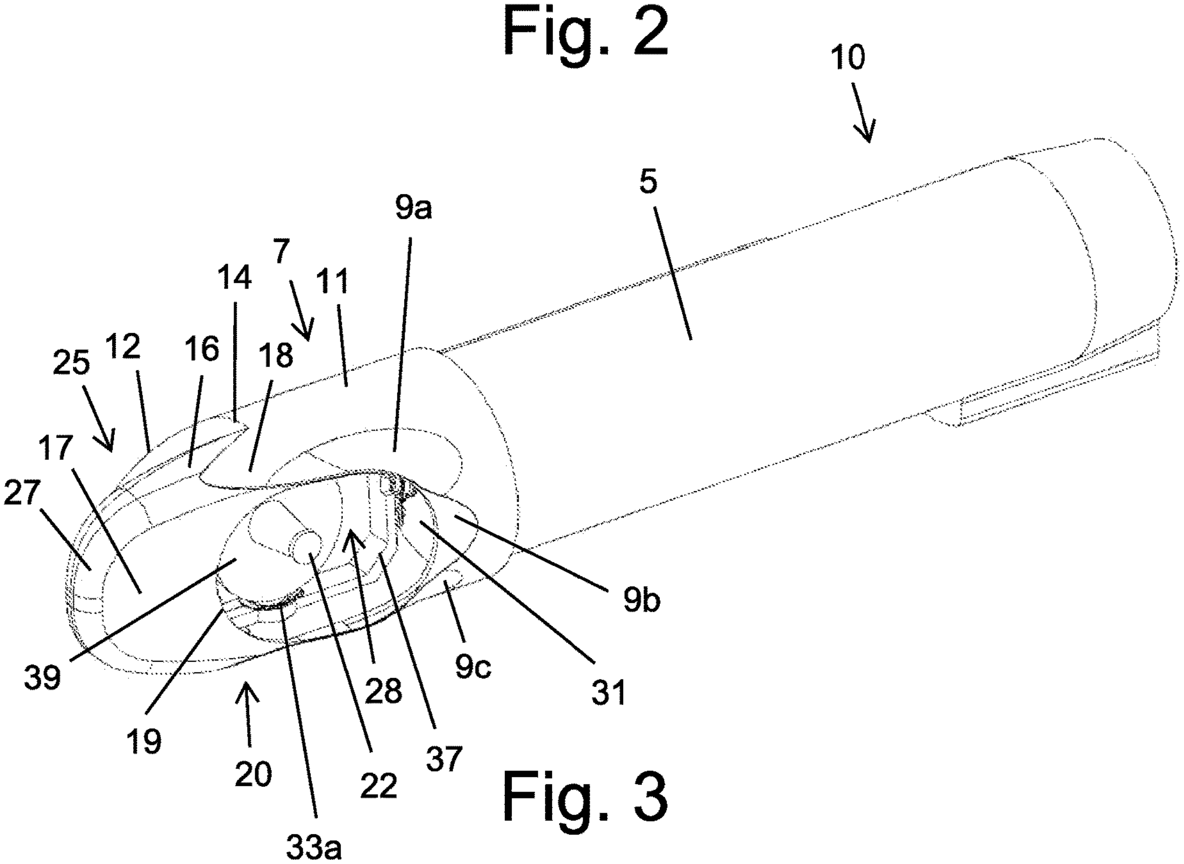
FIG. 3 is another perspective view of the pod of FIG. 1, showing a target-facing section.

Target-facing section 20 is shown in FIG. 3 while the optical window is removed for purposes of clarity, to illustrate the hollow interior 28 of turret 7, as well as various components that are housed therewithin. Target-facing section 20 is configured with the planar optical window and with the window-surrounding plate 17 that is coplanar with, and provides support for, the optical window. The border 19 of the opening for the optical window is shown to be oval, but other shapes are also within the scope of the invention, insofar as its surface area is sufficiently large enough to provide for an uninterrupted field of view throughout the entire range of motion of optical sensor 22. Recessed regions 9*a-c* contiguous with border 19 are formed in the cylindrical wall of casing portion 11 to prevent blockage of the field of view of optical sensor 22.

Window-surrounding plate 17 is coincident with leading edge 16 of turret 7, and is parallel to and smoothly matches the optical window, to prevent the creation of shockwaves or local flow separation to minimize local acceleration and the subsequent creation of shockwaves at transonic flight conditions, as well as avoiding local flow separation. The transitional region between leading edge 16 and plate 17 is formed with a fillet 27 or other type of rounded edge. Fillet 27 extends to a thin portion 18 of cylindrical turret portion 11 that obliquely protrudes from its forward edge 14 to provide a smooth transition. Leading edge 16 in turn extends to the intersection between forward edge 14 and oblique portion 18.

Figure 4:
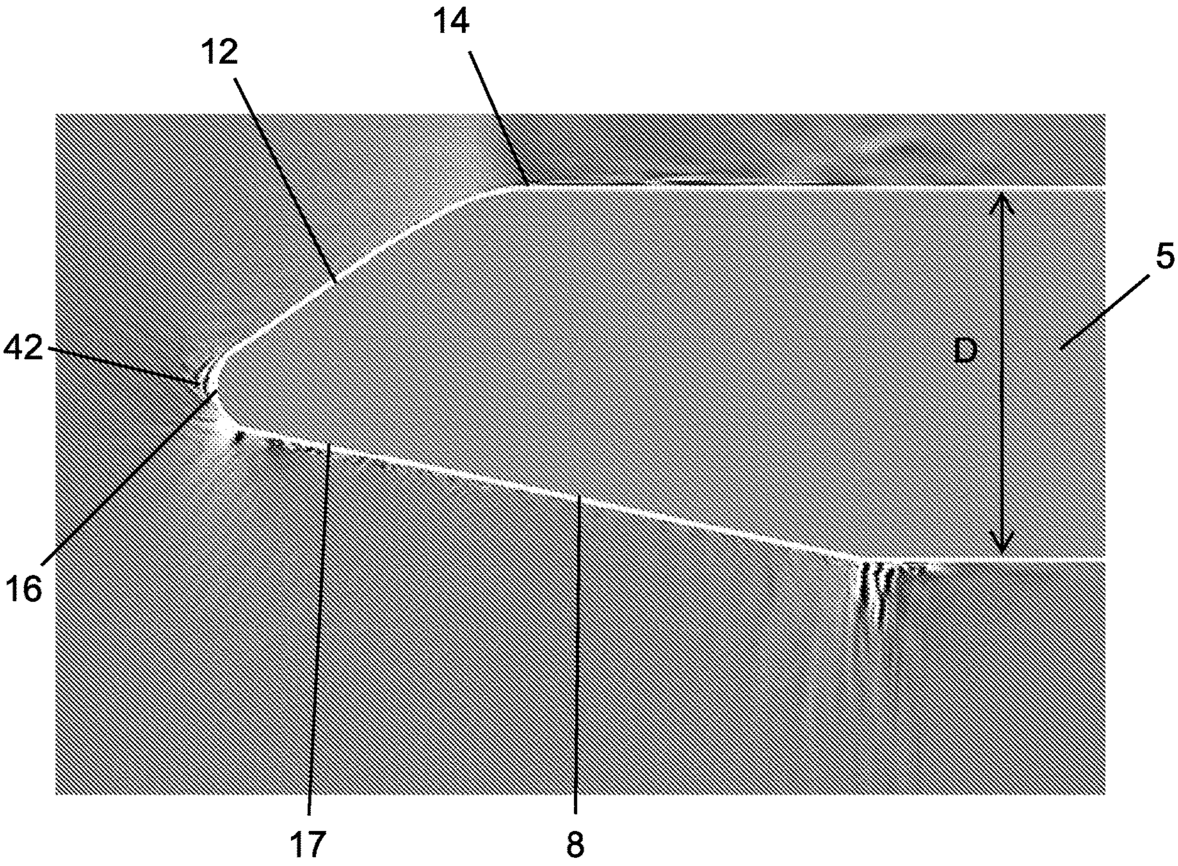
FIG. 4 is a high-fidelity simulation of a cross-sectional view of a portion of the pod of FIG. 1 that includes the optical window, illustrating a distortion-free region to the front of the optical window.

With reference to FIGS. 2, 4 and 5, target-opposing section 25 is configured with a curved surface 12 that extends forwardly from forward edge 14 of cylindrical portion 11 to transversally rounded leading edge 16 of the turret, the latter peripherally extending between diametrically opposite regions of cylindrical portion 11. Surface 12 is shown in FIG. 2 to be separated into two parts merely as graphical means to illustrate its curved contour.

The inclination and curvature of surface 12 relative to window-surrounding plate 17 is carefully designed to minimize the occurrence of flow separation and shockwaves over the optical window, throughout the operation envelope defined by the angle of attack, Mach number, and flight altitude. For example, for a Mach number of 0.8, an altitude of 30,000 ft, and an angle-of-attack less than or equal to 5 degrees, the flow-induced disturbances over the optical window are negligible.

The presence of curved surface 12 also attenuates the production of shock waves, to ensure that the shock wave will not be localized at the optical window. The inventors have discovered that the optical window is assured of not being exposed to any shock wave when it is separated rearwardly from leading edge 16 of turret 7 by a distance of at least 0.6 D, where D is the diameter of body 5. Here D is referred to as a geometrical scale. The distance of 0.6 D was found empirically and it is not universal but is strongly dependent upon the configuration and flight envelope. The distancing assures that leading-edge acceleration-related supersonic pockets and shock waves are positioned only in front of the optical window, and accordingly do not induce optical aberrations.

The configuration of rounded leading edge 16 is also instrumental in shock wave conditioning by ensuring a stable shock wave when the radius of curvature of leading edge 16 is less than or equal to 0.18*D/2, where D is the diameter of body 5. A larger radius of curvature would induce larger-magnitude acceleration, inducing in turn a larger supersonic pocket and a stronger shock wave over the optical window. Once again, D is used only as a geometrical scale. The limit of the curvature radius was found empirically and it is not universal but strongly dependent upon the configuration and flight envelope.

FIG. 4 illustrates contours of simulated dilatation that appear on a cross-sectional view of the flow field across optical window 8. Dilatation is a good measure to illustrate the compressibility of flow. The index of refraction is linearly dependent on flow density, and therefore significant variations of flow compressibility over the optical window induce optical aberrations. These results were numerically obtained at transonic speeds, for example, a Mach number of 0.8. As a shock wave 42 developed forwardly to leading edge 16, optical window 8 is shown to be distortion-free with respect to flow separation and shock wave formation.

As shown in FIGS. 3, 6 and 7, turret interior 28 is delimited by the turret casing, which comprises the rear cylindrical casing portion and the forward non-cylindrical casing portion, and at one longitudinal end by wall 31 located at an intermediate region of cylindrical casing portion 11 and at the other longitudinal end by wall 34 that transversally extends between inclined surface 12 and window-surrounding plate 17 at a region relatively close to leading edge 16. A terminal end of the rotational drive assembly for controlling the turret rotation may be connected to wall 31.

A gimbaled frame 37, which may be a rectangular and centrally opened frame, is connected to the interior of the turret casing, and a disk 39 is pivotally supported to gimbal frame 37 by two diametrically opposed bearings 33*a* and 33*b* that define the pivot axis. An optical sensor 22 protruding from the gimbaled disk 39 points towards and is only slightly spaced from, the optical window at all angular positions of the disk shown in FIGS. 7A-C to ensure good optical performance, when covering the opening for the optical window.

Although the description relates to a single optical sensor, it will be appreciated that a plurality of optical sensors may likewise protrude from disk 39, whether identical or different sensors. The plurality of optical sensors may operate independently or in unison.

A pin (not shown) passing through, and connected to, disk 39 is rotatably mounted to bearings 33*a* and 33*b*. A motor mounted on gimbal frame 37 controllably drives the pin so that optical sensor 22 will be positioned at a desired orientation to increase its field of view. Disk 39 may also be pivotally mounted in other ways to define additional pivot axes, such as pivotally mounted to an inner gimbal frame that is movably connected to the outer frame 37, so that the disk will be afforded three degrees of freedom.

Control circuitry for controllably repositioning disk 39 may be mounted on gimbal frame 37, while interconnecting wiring may be embedded within one or more of its sides. The control circuitry may also be operative to controllably operate optical sensor 22 and to controllably rotate turret 7.

A reconnaissance system comprising the control circuitry may be configured to operate in either an automatic mode or a manual mode, or in a combination of automatic and manual modes in the same mission. In the automatic mode, the reconnaissance system is configured to command optical sensor 22 to automatically acquire images of preplanned targets. Based on the mission plan, the reconnaissance system in the automatic mode automatically activates one or more selected sensors as the aircraft approaches the target, causes the turret to rotate in response to the instantaneous orientation of the aircraft, controls the relative orientation of the selected sensors, and initiates or terminates recording and transmission of image data. A mission may be planned in advance at a ground station and then uploaded to a processor of the reconnaissance system prior to the mission. Alternatively, a mission plan may be automatically changed when the aircraft is in flight in response to transmitted data. In a manual mode, the operator can manually change the mission plan during flight. The operator may interrupt an automatic operation and perform reconnaissance functions manually.

It will be appreciated that the optical window is also able to be rendered distortion-free or nearly distortion-free optically when the pod is configured with the same target-facing and target-opposing sections, but without a rotatable turret, while the target-opposing section is set within the airstream. While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A long-range reconnaissance pod, comprising a cylindrical body and a hollow enclosure located forward of the cylindrical body, the hollow enclosure housing an optical sensor configured to image areas of interest during a long-range reconnaissance mission, wherein a casing of said forward hollow enclosure comprises a target-facing section and a target-opposing section that both extend to a leading edge of said pod, wherein an optical window adapted to protect said optical sensor from external flow is secured to said target-facing section, wherein the optical window is planar and the target-facing section comprises a window-surrounding plate that supports and is coplanar with the optical window, wherein the casing comprises a forward non-cylindrical casing portion that includes the target-facing section and the target-opposing section and a rear cylindrical casing portion, wherein the target-opposing section comprises a curved surface that extends forwardly from a forward edge of the rear cylindrical casing portion to the leading edge, and wherein the leading edge is a transversely rounded leading edge peripherally extending between diametrically opposite regions of the rear cylindrical casing portion.

2. The pod according to claim 1, wherein the optical window is separated rearwardly from the leading edge by a distance of at least 0.6 times a diameter of the cylindrical body.

3. The pod according to claim 1, wherein the hollow enclosure is a hollow turret which is rotatable about the cylindrical body.

4. The pod according to claim 1, wherein a radius of curvature of the transversely rounded leading edge is less than or equal to 0.09 times a diameter of the cylindrical body.

* * * * *